March 6, 1945.  V. SPENCER  2,371,074
METHOD OF MANUFACTURING LINOLEUM COMPOSITION
Filed Sept. 26, 1942
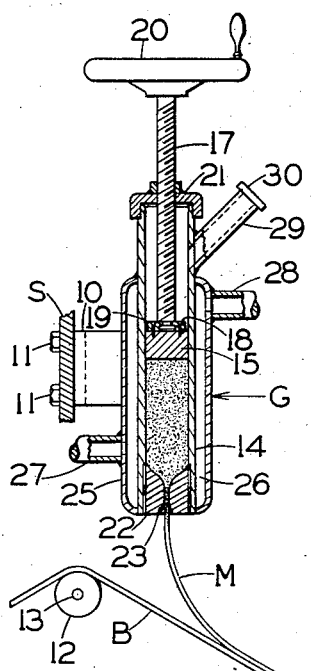
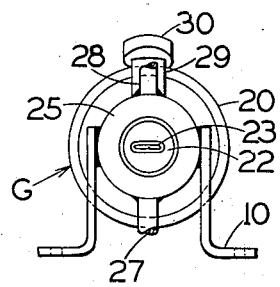
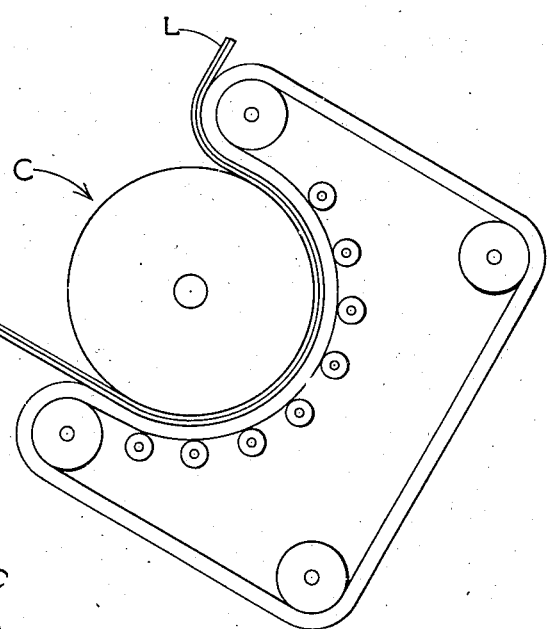
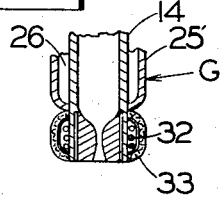
Inventor
Virgil Spencer
by
Walter H Kaufman
Attorney Patented Mar. 6, 1945

2,371,074

UNITED STATES PATENT OFFICE 2,371,074

METHOD OF MANUFACTURING LINOLEUM COMPOSITIONS

Virgil Spencer, East Petersburg, Pa., assignor to Armstrong Cork Company, Lancaster, Pa., a corporation of Pennsylvania Application September 26, 1942, Serial No. 459,846

5 Claims. (Cl. 18—55)

This invention relates to the manufacture of linoleum and, more particularly, to the forming of linoleum composition by extrusion.

In the manufacture of linoleum, drying oil is first oxidized, thickened and bodied by any one of the well-known processes to form a semi-solid, plastic mass, which is mixed with a resin, such as rosin, ester gum, kauri gum, or the like, to produce a so-called linoleum cement. Linseed oil is generally used but other drying or semi-drying oils such as soya bean oil menhaden oil, and the like may be and often are used. Ordinarily, linoleum cement comprises 65% to 85% drying oil and 35% to 15% resin. Linoleum mix is prepared by admixing linoleum cement with suitable fillers such as cork, wood flour, and the like, mineral filler and suitable pigments for coloring. The linoleum mix, in the form of particles or lumps, may be passed between calendering rollers to form a sheet of linoleum composition which is applied to and consolidated on a backing fabric such as a web of burlap, to produce the product known to the art as plain linoleum, or the mix may be granulated and deposited through stencils directly onto a backing fabric and then pressed to form molded inlaid linoleum. It is necessary to cure or mature the linoleum under heat to polymerize the partially processed drying oil and harden the linoleum. Maturing is usually accomplished by suspending the linoleum in festoons in stoves heated to a temperature of about 160° F. to 190° F. for a number of days.

Many unsuccessful attempts have been made to form linoleum mix into relatively thin sheets of uniform thickness, or other desired shape, by heating the mix and forcing it, under pressure, through an extrusion die of suitable shape in the same manner as in the extrusion of plastics including thermoplastic binder and fillers. The friction between the outer or skin surface of the mix and the wall surface of the extrusion tube is so great that the mix cannot be extruded. In some attempts hydraulic pressures sufficient to rupture a heavy metal extrusion tube have been applied without extrusion of the composition. Reduced temperatures have been tried without success and elevated temperatures have increased the tackiness and frictional resistance of the composition. Raising the temperature of a linoleum mix increases its plasticity but, unlike many other thermoplastic materials, increasing the plasticity also increases the tackiness which in turn increases the friction and prevents extrusion.

I have discovered that as the temperature of a linoleum mix is increased, there is a first temperature range in which the tackiness of the linoleum mix progressively increases, a second higher temperature range in which the tackiness remains substantially constant and starts to decrease, and a third, still higher temperature range in which the tackiness greatly decreases. This temperature is unusually high for the working of linoleum mixes, much above normal calendering temperatures and substantially higher than curing temperatures. If the mix is heated to a temperature above the range in which the tackiness starts to decrease, and into the range where tackiness materially decreases, the linoleum mix may be extruded or flowed through a die to form a uniform sheet of linoleum composition. By this discovery I have made possible for the first time the extrusion of linoleum composition by heating the surface of the mix adjacent the extrusion die to such extreme temperatures that frictional resistance is materially reduced.

These and other novel features will appear more fully in the following detailed description of the process which will be given in conjunction with the attached drawing of an apparatus for carrying out the process, in which:

Fig. 1 is a schematic representation of an apparatus for carrying out my novel process and includes a longitudinal sectional view of one form of an extrusion device and a schematic representation of a blanked type consolidating calender;

Fig. 2 is an end elevational view of the extrusion device of Fig. 1;

Fig. 3 is a diagrammatic representation by graph of the comparative tackiness of a linoleum mix at different temperatures; and, Fig. 4 is a diagrammatic representation of an alternative heating means for the extrusion device shown more fully in Fig. 1.

Referring to the drawing and more particularly to Figures 1 and 2, an extrusion device or gun G mounted on a suitable support S by means of a bracket 10 and bolts 11 is shown for extruding a relatively thin, wide ribbon or sheet of linoleum composition M. The sheet M is preferably applied directly to a backing strip B, such as a strip of burlap which may be supported by one or more rollers 12 rotatably mounted on suitable trunnions 13. The backing strip B and the sheet of linoleum composition M are pressed together by a conventional heated consolidating calender C to form a sheet of linoleum L suitable upon curing for use as a covering for floors, walls or other surfaces. For purposes of illustration, the thickness of the backing B and the sheet of composition M are exaggerated.

The extrusion gun G comprises a pressure cylinder 14 having a piston 15 therein and connected to an end of a threaded piston rod 17 by means of a plate 18 secured to the piston 15 by bolts 19. A hand wheel 20 is fastened to the outer end of the rod 17 which threadedly engages an end cap 21 of cylinder 14. The other end wall 22 of the cylinder is provided with a discharge orifice 23, rectangular in cross section in the embodiment illustrated.

The cylinder 14 is provided with a jacket 25 welded thereto to provide a heating chamber 26 between the jacket 25 and the outer surface of the cylinder 14. The jacket 25 is provided with an inlet connection 27 which communicates with a source of high temperature heating fluid, such as hot oil and an outlet connection 28 which communicates with a drain or any suitable recirculating means. High temperature steam may be used for heating the extrusion gun, in which event, the inlet and outlet connections 27 and 28 are preferably reversed. Thus hot fluid or gas is circulated through the chamber 26 for heating at least the forward end portion of cylinder 14 and the forward end wall 22, all as more fully hereinafter described. The cylinder 14 is also provided with an inlet tube 29 through which the particles or lumps of linoleum mix may be fed into the cylinder for extrusion upon retraction of the piston 15. A cap 30 is provided for closing tube 29 when mix is not being fed into the cylinder.

Fig. 4 illustrates a modified embodiment of the means for heating the outlet end of the extrusion gun G. The jacket 25' is shorter than the jacket 25 of Fig. 1 and an annular electrical heating coil 32 with its insulation 33 is mounted on the lower end of the gun G for heating the lower end of tube 14 and wall 22. With the construction of Fig. 4, additional heat may be supplied for heating the additional thickness of metal. Further, it may be desirable when extruding some linoleum mixes to heat the lower end of the tube 14 and wall 22 to a temperature higher than the temperature maintained in the chamber 26 by the hot fluid or gas therein.

To operate the extrusion gun G, the hand wheel 20 is manually rotated to withdraw the piston 15 to the upper end of the cylinder. The cylinder is then filled with linoleum mix which preferably has been warmed to a plastic condition. Rotation of the hand wheel 20 in the opposite direction moves the piston 15 forwardly toward the head end of the cylinder and applies pressure to the linoleum mix to force it through the orifice 23. The inlet and outlet ends of outlet orifice 23 is shown as flared but the illustration is not intended to show the precise contour of the orifice as this will be determined by the character of the mix being extruded, its shape and thickness and the pressure necessary to extrude the material.

Referring more particularly to Fig. 3 of the drawing, the ordinate represents the temperature range and the abscissa schematically represents the degree of tackiness. The ratio of tackiness to temperature is schematically represented by the curve a—d. Starting at a low temperature, as the temperature is increased, the tackiness increases as is represented by the line a—b. An additional increase in the temperature over a considerable range does not materially change the tackiness, it remaining substantially constant as is schematically represented by the line b—c. As the temperature is further increased, however, the tackiness materially decreases as schematically represented by the portion c—d of the curve a—d. It will be noted in Figure 3 that the tackiness decreases below the tackiness represented by the line a—b when the temperature reaches the point c' and that the tackiness continues to decrease as the temperature increases to point d. It has been found that the peak or greatest tackiness occurs at a point along line b—c and at a temperature in the range of approximately 300° F. to 400° F. with a linseed oil-rosin type cement. It has also been found that at approximately a temperature range of 400–750° F. the tackiness of the linoleum mix has been lowered sufficiently to enable the mix to be extruded at reasonable pressures. It should be understood that the temperature ranges will vary depending upon the constituents of the linoleum mix and that the curve a—d is merely a schematic representation of the ratio of tackiness to temperature. The curve a—d will also vary according to the constituents of the linoleum mix, but, for any mix, the curve will have three portions corresponding to lines, a—b, b—c, and c—d.

When extruding any of the present linoleum mixes, it is preferable that the body of linoleum mix be heated to increase its plasticity before being placed in the extrusion gun. It being understood that there may be a small amount of heat imparted to the body of linoleum mix while in the extrusion gun. The temperature of the mix falls within the range schematically represented by the portion a—b of the curve a—d and is preferably not over about 350° F. The temperature of the heating fluid within the chamber 26 and/or of coil 32 is such as to flash heat only the surface skin portion of the mix to the lubricating temperature, which temperature is within the range represented by the portion c—d of the curve a—d and is both materially above the temperature at which sticking occurs and above the flow point of the linoleum cement. It is preferable that the linoleum mix be extruded at the lowest possible temperature. The exact temperature for any particular mix will be partially dependent on the constituents of the mix.

The rate of flow of mix through the extrusion die and the temperature of the extrusion die are such that only the outer skin portion of the linoleum mix is heated to the high lubricating or substantially fluid temperature, at which temperature the tackiness is so reduced that the mix can be flowed through the die. This last mentioned temperature will always be within the range schematically represented by the line c—d and will usually be within the range of about between 400°–750° F.

By the term "extrusion die," it is intended to include all walls past the surfaces of which the lineloum mix is flowed under extrusion pressure. In the apparatus shown in the drawing, the term "extrusion die" includes both the forward end portion and the end wall 22 of cylinder 14.

It is obvious that various modifications may be made from the method disclosed in connection with the illustrated apparatus without departing from the spirit or scope of my invention. For instance, other forms of extrusion apparatus may be employed; the linoleum composition may be extruded in the shape of rods or tubes or in sheets of different transverse configurations; the linoleum composition, after extrusion may be put to uses other than as a floor or wall covering; and a plurality of extrusion guns may be used simultaneously to form a single relatively wide sheet of linoleum composition. Additionally, it is contemplated that extrusion means may be used which is so constructed and arranged as to continuously extrude linoleum composition and which is provided with means for continuously feeding linoleum mix into the extrusion means.

What is claimed is:

1. In a process of forming a shaped body, such as a sheet, of linoleum by extrusion of a linoleum mix including a semi-solid drying oil and resin binder together with filler particles, said mix having the physical characteristics of progressively increasing in tackiness in an initial temperature range, and decreasing in tackiness to a point below the tackiness of the intial range in a higher temperature range substantially above the initial temperature range, said higher range lying above normal calendering temperatures and substantially above curing temperatures, the steps of applying pressure to the linoleum mix to force the same through an extrusion die and heating the surface only of the mix in contact with the die to a temperature within said higher range and above 400° F. where tackiness is decreased to a point below the tackiness of the initial range and extrusion made possible.

2. In a method in accordance with claim 1, the additional step of pre-heating the linoleum mix to a plastic condition prior to the application of pressure for extrusion.

3. In a method in accordance with claim 1, the additional step of pre-heating the linoleum mix to a temperature up to about 350° F. prior to the application of pressure for extrusion.

4. In a process of forming a shaped body, such as a sheet, of linoleum by extrusion of a linoleum mix including a semi-solid linseed oil and rosin binder together with filler particles, said mix having the physical characteristics of progressively increasing in tackiness in an initial temperature range up to about 300° F. and decreasing in tackiness in the range between about 400° F. and 750° F. to a point below the tackiness of the initial range, the steps of applying pressure to the linoleum mix to force the same through an extrusion die and heating the surface only of the mix in contact with the die to a temperature substantially above 400° F. where tackiness is decreased to a point below the tackiness of the initial range and extrusion made possible.

5. In a process of forming a shaped body, such as a sheet, of linoleum by extrusion of a linoleum mix including a semi-solid drying oil and resin binder together with filler particles, said mix having the physical characteristics of progressively increasing in tackiness in an initial temperature range, maintaining substantially constant tackiness in a second temperature range above the initial range, and greatly decreasing in tackiness in a third temperature range above the second temperature range, said third temperature range lying above normal calendering temperatures, substantially above curing temperatures, and in the range between 400° F. and 750° F., the steps of applying pressure to the linoleum mix to force the same through an extrusion die and heating the surface only of the mix in contact with the die to a temperature within said third range where tackiness is decreased to a point below the tackiness of the initial range and extrusion made possible.

VIRGIL SPENCER.